UNITED STATES PATENT OFFICE.

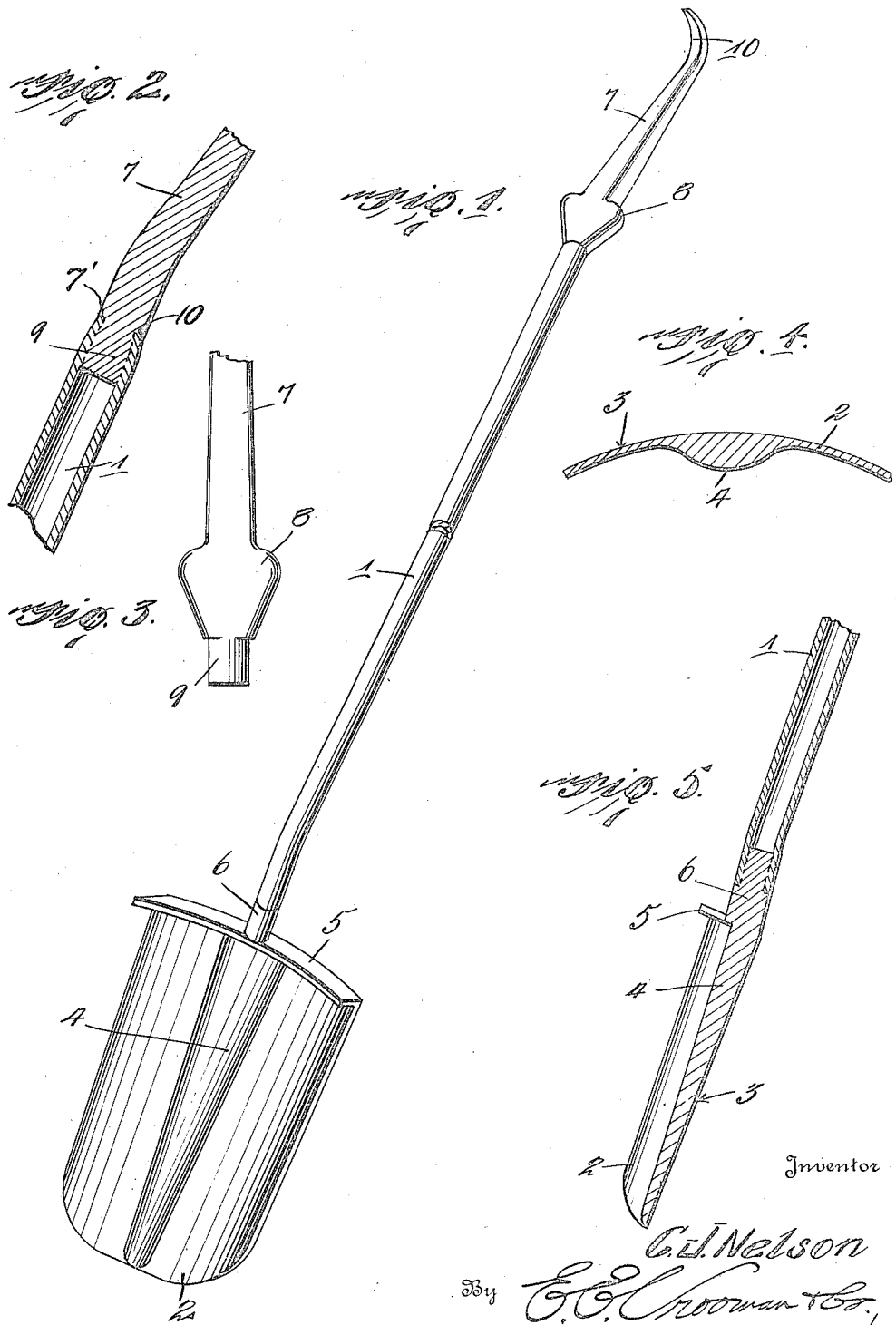

CARL J. NELSON, OF PALERMO, NORTH DAKOTA.

COMBINATION SPADE AND CROWBAR.

1,253,472.          Specification of Letters Patent.     Patented Jan. 15, 1918.

Application filed December 20, 1916. Serial No. 138,023.

*To all whom it may concern:*

Be it known that I, CARL J. NELSON, a citizen of the United States of America, residing at Palermo, in the county of Mountrail and State of North Dakota, have invented certain new and useful Improvements in Combination Spades and Crowbars, of which the following is a specification, reference being had therein to the accompanying drawing.

This invention relates to a combination spade and crowbar and has for its principal object the production of a structure wherein the spade is carried upon one end of the handle and the crowbar upon the opposite end thereof.

Another object of this invention is the production of a combination spade and crowbar wherein the hollow handle has shanks extending from the spade and from the crowbar projecting thereinto and being welded into engagement therewith so as to form a one-piece structure.

Another object of this invention is the production of a combination spade and crowbar wherein the spade is provided with a central dividing rib formed thereon for facilitating the tearing of the earth as the same is being lifted by the spade.

With these and other objects in view this invention consists of certain novel combinations, constructions, and arrangements of parts as will be hereinafter fully described and claimed.

In the accompanying drawing:—

Figure 1 is a detail perspective view of the combination spade and crowbar, a portion of the handle being broken away.

Fig. 2 is a fragmentary sectional view through one end of the handle and a portion of the crowbar.

Fig. 3 is a plan view of a portion of the crowbar before the same is secured to the handle.

Fig. 4 is a transverse sectional view taken across the spade.

Fig. 5 is a central vertical section through one end of the handle and the spade.

Referring to the accompanying drawing by numerals it will be seen that the device comprises a hollow handle 1 which, of course, may be of any size and length desired. The spade 2 is provided with an even rear surface 3, and is substantially concavo-convex in cross-section, as illustrated in Fig. 4. This spade 2 is provided with a central rib 4 formed integral thereon, this rib 4 increasing in size from its outer end toward its inner end. Accordingly, it will be seen that when the spade is forced into the ground the rib 4 will form a divide for the dirt or earth lifted thereby and will easily tear or split the soil for causing the spade to be lifted easily. The flange 5 is formed upon the inner end of this spade 2 extending at right angles to the body of the spade, and extending entirely across the inner end thereof. Accordingly, it will be seen that a broad bearing surface is provided upon which the user may place his foot for forcing the spade into the ground. An integral shank 6 extends from the inner end of the spade in alinement with the rib 4 and beyond the flange 5 and this shank 6 projects into the handle 1, wherein it is welded as clearly shown in Fig. 5. Therefore, it will be seen that after the handle is welded upon the shank 6 the spade 2 will be positively retained in engagement with the handle 1.

The crowbar 7 is provided with an enlarged flattened body 8 formed upon its inner portion from which extends a shank 9. This shank 9 is extended into the opposite end of the handle 1 with respect to the shank 6 and after this action the handle 1 is welded upon the shank 9 for positively retaining the crowbar in engagement with the handle. The outer end 10 of the crowbar 7 may extend in any direction desired for allowing the same to be used as a pinch bar for lifting or prying objects when so desired. It is, of course, obvious that by the provision of the body 8 additional weight is provided for the crowbar 7 for causing the same to accomplish the functions ordinarily ascribed to crowbars, while because of the flattened construction of the body 8 it will not be in the way but will extend evenly with two side planes of the handle 1.

It will be noted that the shank 9 of the crowbar 7 converges toward its inner ends as shown clearly in Fig. 2, thereby forming a shoulder 7' adjacent the body 8 of the crowbar 7. The hollow handle 1 has a converging end formed by clamping this end 10 upon the tapering or converging shank 9 as shown in Fig. 2, thereby positively holding the shank 9 in engagement with the handle 1 and preventing its accidental removal. By having the handle clamped to produce the converging end, it is obvious that the end of the handle by fitting against the shoulder 10 as shown in Figs. 1 and 2, a foreign object will be prevented from being inserted under or against the converging end and spreading this end. If such action could take place by the projecting of the handle beyond the side surfaces of the body 8, the crowbar would in due time be accidentally displaced. However, the clamped end of the handle will prevent the handle from being pried from engagement with the shank, while the converging end of the handle fitting upon the reduced shank, will hold the crowbar in fixed engagement with the handle.

From the foregoing description it will be seen that a very simple and efficient combination spade and crowbar has been provided wherein the hollow handle will comprise a comparatively light construction for facilitating the use of the device as a spade, although the additional weight provided by the crowbar will cause the crowbar to operate efficiently when desired. Furthermore, it will be seen that by the extension of the shanks into the ends of the hollow body 1 and by the welding of the ends of the handle upon the shanks the combination spade and crowbar will be held against accidental displacement.

What is claimed is:—

In a device of the class described, the combination of an elongated hollow handle, a crowbar having a body formed thereon, a shank projecting from said body, said shank having an enlarged outer end and converging toward said body so as to be reduced adjacent said body, thereby forming a shoulder upon said body, said shank fitting within said hollow handle, said handle being clamped upon said shank so as to form a converging portion, whereby the reduced end of said handle will hold said shank against displacement, while the end of said handle by fitting upon said shoulder will be prevented from being displaced by the insertion of a foreign object.

In testimony whereof I hereunto affix my signature.

CARL J. NELSON.

Copies of this patent may be obtained for five cents each, by addressing the "Commissioner of Patents, Washington, D. C."